(12) United States Patent
Kuisma (10) Patent No.: US 11,085,768 B2
(45) Date of Patent: Aug. 10, 2021

(54) SYNCHRONIZATION STRUCTURE FOR GYROSCOPE

(71) Applicant: MURATA MANUFACTURING CO., LTD., Nagaokakyo (JP)

(72) Inventor: Heikki Kuisma, Helsinki (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 288 days.

(21) Appl. No.: 16/406,500

(22) Filed: May 8, 2019

(65) Prior Publication Data
US 2019/0346265 A1 Nov. 14, 2019

(30) Foreign Application Priority Data
May 8, 2018 (FI) ....................................... 20185423

(51) Int. Cl.
*G01C 19/574* (2012.01)
(52) U.S. Cl.
CPC .................................. *G01C 19/574* (2013.01)
(58) Field of Classification Search
USPC ...................................................... 73/504.12
See application file for complete search history.

(56) References Cited

U.S. PATENT DOCUMENTS

| 2008/0150392 | A1 | 6/2008 | Delevoye et al. |
| 2011/0185829 | A1 | 8/2011 | Sugita et al. |
| 2012/0048017 | A1 | 3/2012 | Kempe |
| 2012/0055248 | A1 | 3/2012 | Hammer |
| 2013/0000404 | A1 | 1/2013 | Katsumata et al. |
| 2013/0009716 | A1 | 1/2013 | Phan Le |
| 2013/0167636 | A1 | 7/2013 | Coronato et al. |
| 2014/0090470 | A1 | 4/2014 | Fujimoto et al. |
| 2016/0341550 | A1 | 11/2016 | Geckeler et al. |
| 2018/0058853 | A1 | 3/2018 | Jia et al. |

FOREIGN PATENT DOCUMENTS

| EP | 2520940 A1 | 11/2012 |
| EP | 3 249 356 A1 | 11/2017 |
| WO | WO 2017/130312 A1 | 8/2017 |
| WO | 2018022803 A1 | 2/2018 |

OTHER PUBLICATIONS

Finnish Search Report dated Nov. 5, 2018 corresponding to Finnish Patent Application No. 20185423.
Oct. 14, 2019 Search Report issued in European Patent Application No. 19171722.

*Primary Examiner* — John Fitzgerald
*Assistant Examiner* — Rodney T Frank
(74) *Attorney, Agent, or Firm* — Squire Patton Boggs (US) LLP (57) ABSTRACT

A microelectromechanical z-axis gyroscope which comprises a proof mass system centred around a gyroscope center point. The oscillation of first and second proof mass pairs is synchronized by a substantially circular synchronization element which is centred at the gyroscope center point and comprises four first attachment points. Each proof mass is attached to the nearest first attachment point on the substantially circular synchronization element. The substantially circular synchronization element also comprises two or more second attachment points, and a substantially linear suspender extends tangentially from each second attachment point to an anchor point.

6 Claims, 8 Drawing Sheets

SYNCHRONIZATION STRUCTURE FOR GYROSCOPE

FIELD OF THE DISCLOSURE

The present disclosure relates to microelectromechanical (MEMS) gyroscopes, and more particularly to z-axis gyroscopes which measure angular rotation about an axis perpendicular to the substrate plane. The present disclosure further concerns MEMS gyroscopes where two proof mass pairs oscillate in linear and/or rotary motion, and synchronization structures which are used to configure the proof mass oscillation modes so that desired modes are synchronized and undesired modes are suppressed.

BACKGROUND OF THE DISCLOSURE

MEMS gyroscopes typically include proof masses which are driven into either linear or rotational oscillating motion or a combination of these two motions. If a proof mass rotates around an axis that doesn't cross the centre of gravity of the mass, then the motion of the centre of gravity will be a combination of rotation and linear motion. In z-axis MEMS gyroscopes, the drive or primary oscillation induced by drive transducers is configured to occur in the substrate plane. If the gyroscope undergoes angular rotation about the z-axis, which is perpendicular to the substrate plane, the resulting sense or secondary oscillation induced by the Coriolis force also will also occur in the substrate plane.

The partly mobile proof masses, which constitute the rotation-sensitive elements of the gyroscope, may be suspended from a fixed structure by suspenders which are configured to flexibly allow oscillating drive motion and sense motion at a desired resonant frequency. The net reaction force and torque of the drive oscillation mode and sense oscillation mode should preferably be zero, so that kinetic energy does not leak from these desired modes and external vibrations do not couple to these desired modes. This ideal can be achieved with suspension arrangements which are suitably flexible for the desired oscillation modes, so that desired resonant frequencies are achieved for the desired modes.

However, regardless of whether the drive and sense oscillation modes are ideal or not, the proof masses may simultaneously exhibit undesired oscillatory movement if external vibrations or shocks act on the gyroscope. Proof masses in z-axis gyroscopes are particularly susceptible to undesired oscillating movement parallel to the substrate plane because it is difficult to design suspenders which would be perfectly flexible for the desired oscillation modes and perfectly rigid for undesired ones. If the undesired resonant oscillation modes cannot be prevented, external vibrations can easily cause disturbances in the angular rate measurement due to overloading the transducers and/or the amplifiers used for obtaining electrical signals. Also, disturbances may occur due to coupling of the external vibrations to the desired modes via small asymmetries due to manufacturing tolerances of the mechanical structures of the gyroscope and/or the electrical transducers for converting the mechanical oscillations to electrical signals and/or the differential amplifiers used for signal amplification.

It is known that a gyroscope where a pair of interconnected proof masses are synchronized to continuously oscillate in opposite directions is less vulnerable to disturbances caused by external vibrations than gyroscopes with only one oscillating proof mass. This is because the effect of the disturbance can be automatically cancelled by reading the measurement signal in a differential manner. It is also known that further robustness can be achieved with an additional pair of proof masses which oscillates orthogonally to the first.

However, a general problem in z-axis gyroscopes with coupled proof mass pairs is that external vibrations may induce common-mode oscillation where a proof mass pair moves simultaneously in the same direction, rather than the opposite direction which is needed for the intended cancelling in a differential measurement. In addition to a suspension arrangement for achieving the desired resonant frequency, z-axis gyroscopes therefore require a synchronization arrangement which should flexibly allow differential-mode oscillation at the resonant frequency but suppress common-mode oscillation. The undesired common-mode oscillation modes may include both linear translation and rotation.

Document EP3249356 discloses a MEMS gyroscope with two pairs of proof masses in translational oscillation. A problem with the synchronization arrangement disclosed in this document is that while synchronizing the desired differential modes it does not at all suppress any of the common-mode oscillations of the proof mass pairs in any modes or directions of motion.

BRIEF DESCRIPTION OF THE DISCLOSURE

An object of the present disclosure is to provide an apparatus for alleviating the above disadvantage.

The object of the disclosure is achieved by an apparatus which is characterized by what is stated in the independent claim. The preferred embodiments of the disclosure are disclosed in the dependent claims.

The disclosure is based on the idea of placing a substantially circular synchronization structure at the center of a gyroscope with two oscillating proof mass pairs and suspending this synchronization structure from the substrate with tangentially oriented, linear suspenders which only allow such elliptical deformation in the synchronization structure which corresponds to the desired oscillation modes but doesn't allow either linear translation or rotation of the synchronization structure.

An advantage of this arrangement is that all linear and rotational common-mode oscillations are effectively suppressed, while drive and sense oscillations are allowed to proceed undisturbed. Another advantage of this arrangement is that it is consuming only a relatively small area near the centre of the gyroscope and its contribution to the area and cost of a gyroscope remains small.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

This disclosure describes a microelectromechanical z-axis gyroscope which comprises a proof mass system centred around a gyroscope center point, where a first axis crosses a second axis substantially orthogonally, and the proof mass system comprises a first proof mass pair aligned in rest position on a first axis, and a second proof mass pair aligned in rest position on a second axis, so that the first and second proof mass pairs in rest position form an essentially symmetrical mass distribution in relation to the gyroscope center point. The first and second proof mass pairs are configured to be driven into a drive oscillation mode in the substrate plane by one or more drive transducers, and to undergo a sense oscillation mode in the substrate plane when the gyroscope undergoes angular rotation.

Either the drive oscillation mode or the sense oscillation mode comprises oscillatory motion where the first proof mass pair moves in a first linear opposing oscillation along the first axis, symmetrically in relation to the gyroscope center point, and the second proof mass pair moves in a second linear opposing oscillating motion along the second axis, symmetrically in relation to the gyroscope center point, so that the first proof mass pair and second proof mass pair oscillate in anti-phase in relation to the gyroscope center point.

The other one of the drive oscillation mode or sense oscillation mode comprises motion where:
 the first proof mass pair moves in a third linear opposing oscillation away from and back towards their rest positions on the first axis in a direction parallel to the second axis, and the second proof mass pair moves in a fourth linear opposing oscillation away from and back towards their rest position the second axis in a direction parallel to the first axis, wherein the third linear opposing oscillation and the same linear opposing oscillation have the same phase in relation to their respective rest positions, and the first proof mass pair and the second proof mass pair oscillate in the same phase in the direction of both a third axis and a fourth axis which pass through the gyroscope center point, wherein the third axis and the fourth axis are orthogonal in relation to each other and are tilted at a 45° angle in relation to the first and second axes, and/or
 both proof masses in the first proof mass pair rotate in a first rotational oscillation in a first direction about vertical axes which pass through each proof mass in the first proof mass pair, while both proof masses in the second proof mass pair rotate in a second rotational oscillation in a second direction, opposite to the first direction and anti-phase in relation to the first rotational oscillation, about vertical axes which pass through each proof mass in the second proof mass pair, The oscillation of the first and second proof mass pairs is synchronized by a substantially circular synchronization element which is located closer to the gyroscope center point than the first and second proof mass pairs. The substantially circular synchronization element is centred at the gyroscope center point and comprises four first attachment points. Each first attachment point is located at a point where the substantially circular synchronization element crosses the first or the second axis. Each proof mass is attached to the nearest first attachment point on the substantially circular synchronization element.

The substantially circular synchronization element also comprises two or more second attachment points, and a substantially linear suspender extends tangentially from each second attachment point to an anchor point.

Figure 1A:
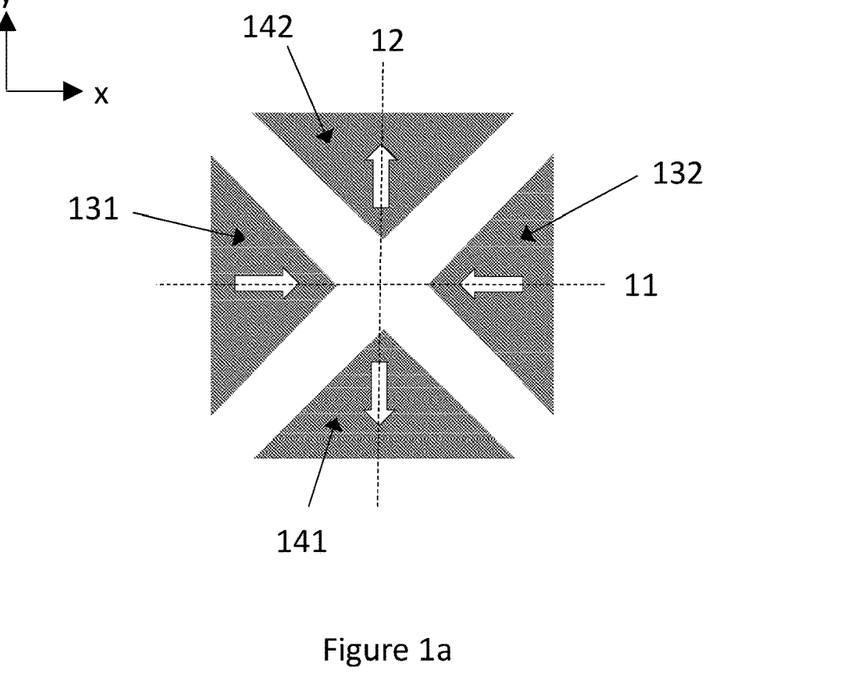
FIGS. 1a-1c illustrate desired oscillation modes in a gyroscope with two proof mass pairs.

FIG. 1a illustrates schematically the linear oscillation mode specified above. The illustrated gyroscope comprises a proof mass system with a first proof mass pair 131+132 and a second proof mass pair 141+142. A first axis 11 crosses a second axis 12 substantially orthogonally at the gyroscope center point. The proof masses are in their rest positions in all FIGS. 1a-1f, and the arrows illustrate their impending movement in the illustrated oscillation mode. The arrows illustrated the simultaneous movement of all proof masses, so they also illustrate the movement phases of the first and second proof mass pairs.

In this disclosure, expressions such as "substantially orthogonally" and "essentially symmetrical" are used to refer to orientations and distributions which should ideally be perfectly orthogonal and symmetrical, respectively. Nevertheless, slight deviations from perfect orthogonality and symmetry are possible, and sometimes unavoidable due to limitations in manufacturing accuracy. The person skilled in the art will understand that the same technical effect can be generated even if the orientation or distribution deviates to some extent from ideal orthogonality or symmetry.

The large white arrows on each proof mass illustrate the direction of motion of that proof mass in one phase of the oscillation cycle. In another phase of the oscillation cycle, each proof mass would move in the opposite direction. The first proof mass pair 131+132 moves in a first linear opposing oscillation along the first axis 11. In this disclosure, "opposing oscillation" which is "symmetrical in relation to the gyroscope center point" refers to an oscillating mass pair where the masses move in opposite directions. For example, in FIG. 1a proof mass 132 moves to the left when proof mass 131 moves to the right, and vice versa. This oscillation is symmetrical in relation to center point when both proof masses 131 and 132 are equidistant from the center point in each phase of the oscillation cycle. This desired oscillation mode may also be called differential oscillation, because it facilitates error cancellation through a differential measurement, as mentioned above.

The second proof mass pair 141+142 moves in a second linear opposing oscillation along the second axis 12. This second oscillation is also opposing and symmetrical, like the first. Furthermore, the second linear opposing oscillation occurs in anti-phase in relation to the first linear opposing oscillating motion. In other words, as illustrated in FIG. 1a, when the first proof mass pair 131+132 moves towards the center point, the second proof mass pair 141+142 moves away from the center point. Conversely, when the first proof mass pair 131+132 moves away from the center point, the second proof mass pair 141+142 moves towards the center point.

The suspenders which suspend the proof masses 131–132 and 141–142 from a fixed structure and the drive transducers which set the proof mass system in drive oscillation are not illustrated in FIG. 1a, or any other figures in this disclosure. Any suitable suspension and driving arrangement which allows the first desired oscillation mode (described below) and one of the second desired oscillation modes (described below) to occur may be utilized. The drive transducers may be electro-static, piezoelectric or magnetic transducers.

The oscillation mode illustrated in FIG. 1a, which may be labelled the first desired oscillation mode of the gyroscope, may be either the drive (primary) oscillation mode or the sense (secondary) oscillation mode. In other words, it may either be induced by a set of drive transducers which apply oscillating forces to the proof mass system, or it may be induced by the Coriolis force when the gyroscope undergoes angular rotation. For the sake of simplicity, only the case where the first desired oscillation mode is drive motion, and the second desired oscillation mode is sense oscillation, will be described in detail. However, the reverse arrangement, where the first desired oscillation mode is sense motion, and the second desired oscillation mode is drive motion, is an alternative option throughout this disclosure. The synchronization structure described in this disclosure performs the same function in both cases by allowing the desired oscillation modes (and, as described in more detail below, suppressing undesired oscillation modes).

Figure 1B:
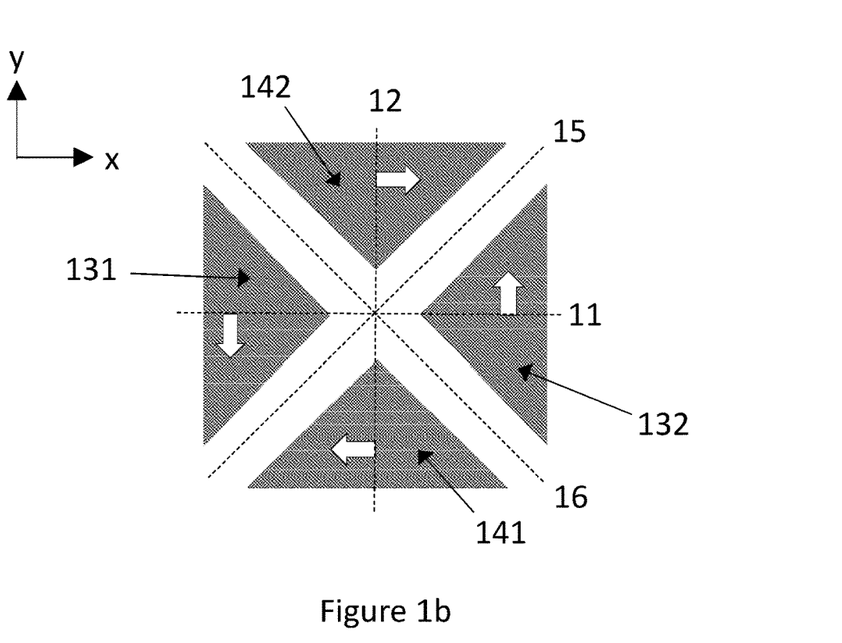
Figure 1C:
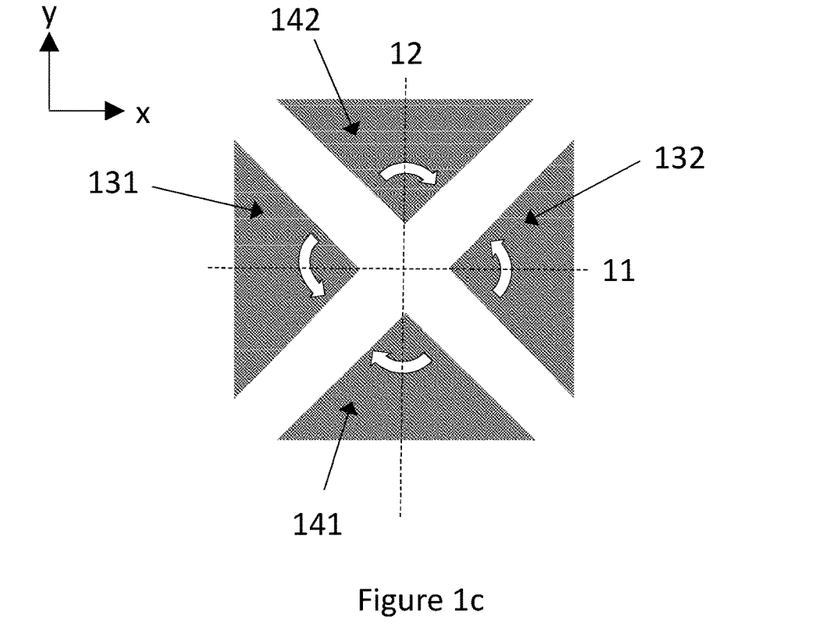

Assuming, then, that FIG. 1a illustrates the drive oscillation mode, FIGS. 1b and 1c illustrate two alternative sense oscillation modes (which may also be labelled two alternative second desired oscillation modes). The sense oscillation mode may also be a combination of the two illustrated alternative modes, depending on the location of the rotation centre with respect to the centre of gravity of the mass. In a z-axis gyroscope, sensitive to angular rotation about an axis perpendicular to the device plane, the suspension arrangements are configured to allow the proof masses to be moved by Coriolis forces which act in the device plane, orthogonal to the drive oscillation. The suspension arrangement can either be configured to allow linear motion or rotational motion or a combination of these two in response to this Coriolis force. The sense mode oscillation may be sensed with transducers that are capacitive, piezo-electric, piezo-resistive or magnetic.

FIG. 1b illustrates one sense oscillation mode where the first proof mass pair 131+132 moves in a third linear opposing oscillating motion parallel to the second axis 12, away from (and, in the opposing phase of the oscillation cycle, back towards) their rest positions on the first axis. The second proof mass pair 141+142 simultaneously moves in a fourth linear opposing oscillating motion parallel to the first axis 11 away from (and, in the opposing phase of the oscillation cycle, back towards) their rest positions on the second axis. The third linear opposing oscillation has the same phase as the fourth, which means that the second proof mass pair move away from and back towards the second axis in the same phase as the first proof mass pair moves away from and back towards the first axis. Furthermore, the third and fourth linear opposing oscillation also occur in the same phase in the direction of third and fourth axes 15 and 16, which pass through the gyroscope center point, are orthogonal in relation to each other and are tilted at a 45° angle in relation to the first and second axes.

In other words, opposing oscillation away from the first axis and parallel to the second axis refers to an oscillating mass pair which is initially aligned on the first axis and symmetrically positioned in relation to both the first and the second axes, and where the masses then oscillate in opposite directions away from the first axis. This opposing oscillation of one mass pair (for example, 131+132) is mirror-symmetric in relation to the center point. When two mass pairs simultaneously oscillate in this manner, as in FIG. 1b, each proof mass will have one motion component in the direction of the diagonal third axis 15, and another motion component in the direction of the diagonal fourth axis 16. The mass pairs 131+132 and 141+142 oscillate in the same phase in the direction of the third axis 15 if the motion components of masses 131 and 141 along the third axis are always oriented in the same direction, and if the motion components of masses 132 and 142 along the third axis are also always oriented in the same direction. If these criteria are fulfilled, then the mass pairs 131+132 and 141+142 also oscillate in the same phase in the direction of the fourth axis 16.

FIG. 1c illustrates an alternative sense oscillation mode where both proof masses in the first proof mass pair 131+132 rotate in a first rotational oscillation in a first direction about vertical axes which pass through each proof mass 131 and 132, while both proof masses in the second proof mass pair 141+142 rotate in a second rotational oscillation in a second direction, opposite to the first direction and anti-phase in relation to the first rotational oscillation, about vertical axes which pass through each proof mass 141 and 142. In FIG. 1c, the first rotational oscillation is illustrated with white arrows pointing counter-clockwise, while the second rotational oscillation is illustrated with white arrows pointing clockwise. The vertical axes which form the center of the rotational movement of each proof mass are determined by the suspension arrangement. The center of mass of each proof mass may be located away from the vertical rotation axis, so that the Coriolis force acting on the mass can generate the desired rotational movement. It is to be noted that if the centre of mass of each proof mass is located away from the vertical axis, then the motion of the centre of gravity of the proof mass is a combination of a rotation and linear motion.

Even though the sense oscillation illustrated in FIG. 1b is linear, and the sense oscillation illustrated in FIG. 1c is partly rotational, they are both caused by the Coriolis force which is a linear force perpendicular to the drive motion illustrated in FIG. 1a if the centre of mass of each proof mass is located away from the vertical rotation axis. The sense oscillation type, and degree of the combination of them, (linear or rotational) is determined by the suspension arrangement. If the drive oscillation of the two proof mass pairs is perfectly anti-phase in relation to the gyroscope center point, then the sense oscillation illustrated in FIGS. 1b and 1c will be perfectly in-phase along the third and fourth axes. In one phase, proof masses 131 and 141 move or rotate towards each other at the same time as proof masses 132 and 142 also move or rotate towards each other, and in the opposite phase proof masses 131 and 142 move or rotate towards each other at the same time as proof masses 132 and 141 also move or rotate towards each other.

A general design principle in z-axis gyroscopes where two proof mass pairs oscillate in the manner described above is that the suspenders should flexibly allow both the drive oscillation mode and the sense oscillation mode so that desired resonant frequencies are achieved, and the synchronization structures should ensure that the desired anti-phase and in-phase relationships are obtained in the proof mass system. However, a general design problem in gyroscopes of this kind is that the suspension and synchronization arrangements which synchronize and promote the desired oscillation modes may also allow and equally promote undesired oscillation modes at nearly the same frequencies as the desired modes. Another design problem is that if the synchronization arrangements are designed around the proof masses at the periphery of the device, they will consume a relatively large area of the device and thus increase the size and cost.

Figure 1D:
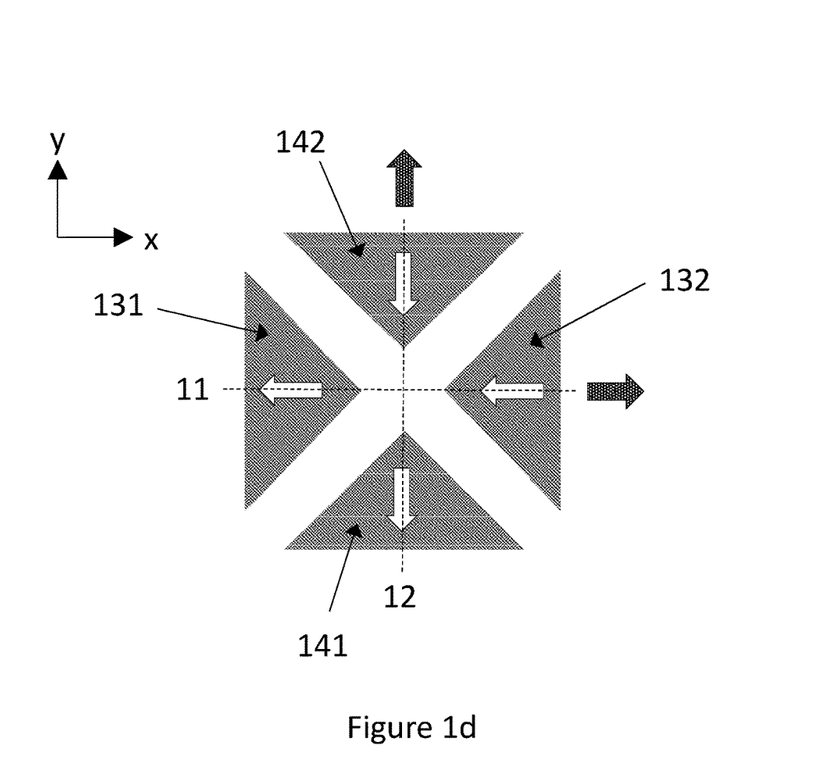
FIGS. 1d-1f if illustrate undesired oscillation modes in a gyroscope with two proof mass pairs.
Figure 1E:
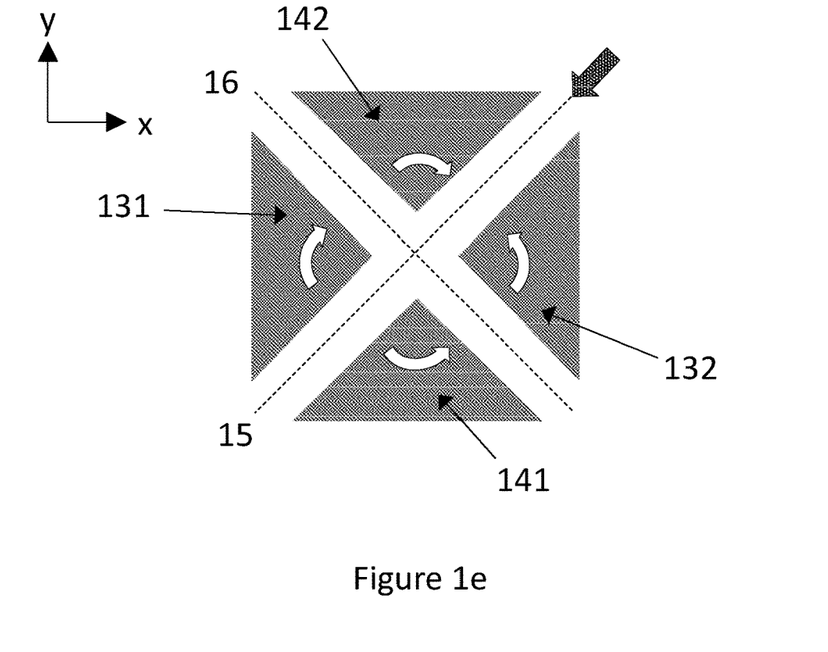
Figure 1F:
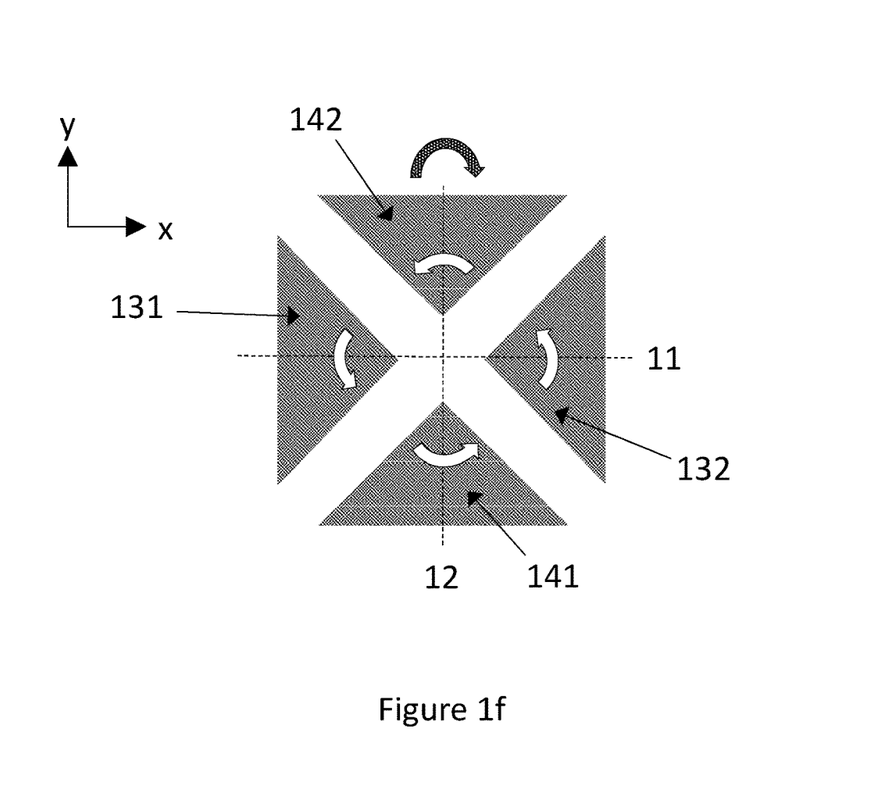

FIGS. 1d-1f illustrate three undesired oscillation modes which may occur in a proof mass system configured to promote the desired oscillation modes illustrated in FIGS.

1*a*-1*c*. The direction of an external force, acting on the gyroscope and causing the motion of the gyroscope, which by the inertia of the masses causes the undesired oscillation of the masses, has been indicated on the outside of the proof mass system in each of these figures as a broad arrow. The external force causing the disturbance is a vibratory force, the frequency of which is close to the resonant frequency of the undesired common mode oscillation of the masses. The white arrows in FIGS. 1*d*-1*f* indicate the effects of one half cycle of this external vibration. The origin of this external vibration may be a rotary machine, a mechanical source of sound or ultrasound (e.g. a loudspeaker) or mechanical impact (e.g. a stone hitting the car chassis) causing the environment to vibrate. In FIG. 1*d*, proof masses 131 and 132 simultaneously move in the same direction along the first axis 11 due to a linear external force causing motion of the gyroscope on this axis. Proof masses 141 and 142, alternatively or simultaneously, move in the same direction along the second axis 12 due to a second linear external force causing motion on this axis. These common-mode oscillations have a direct disturbing effect on a differential-mode measurement if the differential symmetry is not perfect e.g. due to manufacturing tolerances or if they cause mechanical overload of the transducers (e.g. capacitive comb-transducers) or if they produce signals in the transducers that overload the amplifiers and thus prevent a cancellation of the disturbing signal by subtraction of negative and positive signals of equal magnitude.

In FIG. 1*e*, a motion due to linear external force in the direction of the third axis 15 disturbs the desired motion of the proof masses by rotating proof masses 131 and 141 away from each other at the same time as proof masses 132 and 142 rotate towards each other. Similar common mode oscillations, but orthogonal to those of FIG. 1*e*, will be induced if the external vibration is along the fourth axis. In FIG. 1*f*, a rotational external force (torque) about a vertical axis (perpendicular to the illustrated xy-plane) disturbs the desired motion of the proof masses by rotating all proof masses simultaneously in the same direction. In a practical situation the external vibrations will typically be a mixture of linear vibrations and rotational vibrations in all directions and thus all the disturbing common mode oscillations described above may be exited at the same time. It is the objective of this disclosure to provide a synchronization structure which flexibly allows the desired oscillation modes illustrated in FIGS. 1*a*-1*c*, but suppresses the undesired oscillation modes illustrated in FIGS. 1*d*-1*f*, which may be induced by external vibrations.

Figure 2A:
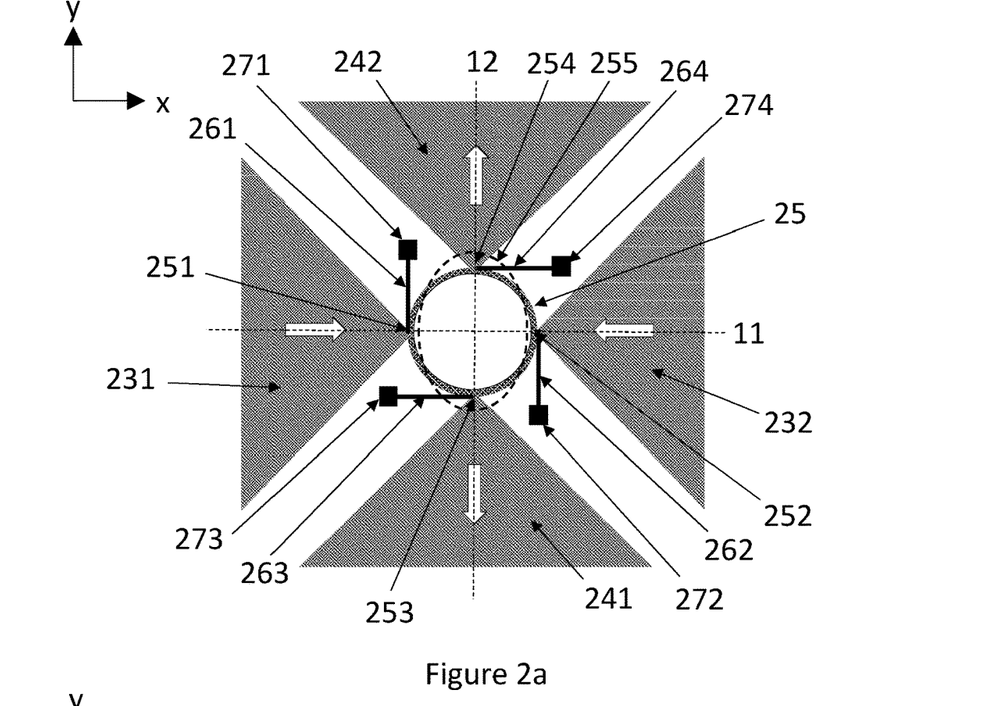
FIGS. 2a and 2c illustrate the action of an anchored circular synchronization element in desired oscillation modes.

FIG. 2*a* illustrates a MEMS gyroscope where reference numbers 231-232 and 241-242 correspond to reference numbers 131-132 and 141-142, respectively, in FIGS. 1*a*-1*c*. The gyroscope also comprises a circular synchronization element 25 centered at the crossing point between the two axes 11 and 12. As seen in the figure, the circular synchronization element 25 lies inside the four proof masses 231-232 and 241-242. In other words, the circular synchronization element 25 is located closer to the gyroscope center point than the first and second proof mass pairs.

The synchronization element comprises four first attachment points 251-254. As seen in FIG. 2*a*, the attachment points may be distributed symmetrically in relation to the center point, at locations where the synchronization element 25 crosses the first axis 11 or the second axis 22. Each proof mass 231-232 and 241-242 is attached to the synchronization element at the nearest first attachment point. The nearest first attachment point may be the one which is closest to the proof mass on the axis which crosses the proof mass.

The number of second attachment points may be four. The circular synchronization element illustrated in FIG. 2*a* comprises four second attachment points 251-254, and four substantially linear suspenders 261-264. Each linear suspender extends tangentially from one second attachment point to one anchor point 271-274. Each first attachment point may coincide with a second attachment point, as in the gyroscope illustrated in FIG. 2*a*. However, this is not necessary always the case, as explained below.

In this disclosure, the term "linear suspender" refers to a structure which has a high aspect ratio (for example a length-to-width ratio) in the xy-plane. In other words, the length of a linear suspender in a first direction is much larger than its width in a second direction, perpendicular to the first. Its height in the vertical direction is typically the same as the height of other elements in the MEMS gyroscope, so its length-to-height aspect ratio may not be anywhere near as large as the length-to-width ratio. The height to width aspect ratio may be greater than 4, giving the ratio 64 for the vertical-to-in-plane stiffness. This enables a design where the in-plane flexibility of the linear suspender is 8 times higher than the in-plane flexibility of the suspenders which suspend the proof masses from a fixed structure (and which determine the resonant frequency with the mass), but the out-of-plane flexibility of the linear suspender is 8 times less than the out-of-plane flexibility of the suspenders which suspend the proof masses from a fixed structure. Such a linear suspender will bend very flexibly in the second direction but resist movement greatly in the first direction (lengthwise), and also in the vertical direction (depending on the height to width aspect ratio).

The operation of the substantially circular synchronization element, and the associated linear suspenders, will be described next. The same desired oscillation mode which was illustrated in FIG. 1*a* has also been illustrated in FIG. 2*a* with white arrows on the proof masses. The substantially circular ring-shaped element 25 will easily deform to an elliptic shape, shown in FIG. 2*a* as 255, but it would be relatively stiff for other shapes of the deformation. The tangentially aligned anchored linear suspenders allow the synchronization element 25 to flexibly assume an elliptical shape when the proof masses move in the illustrated manner, but they will prevent all linear and rotary movements of the element 25.

Figure 2B:
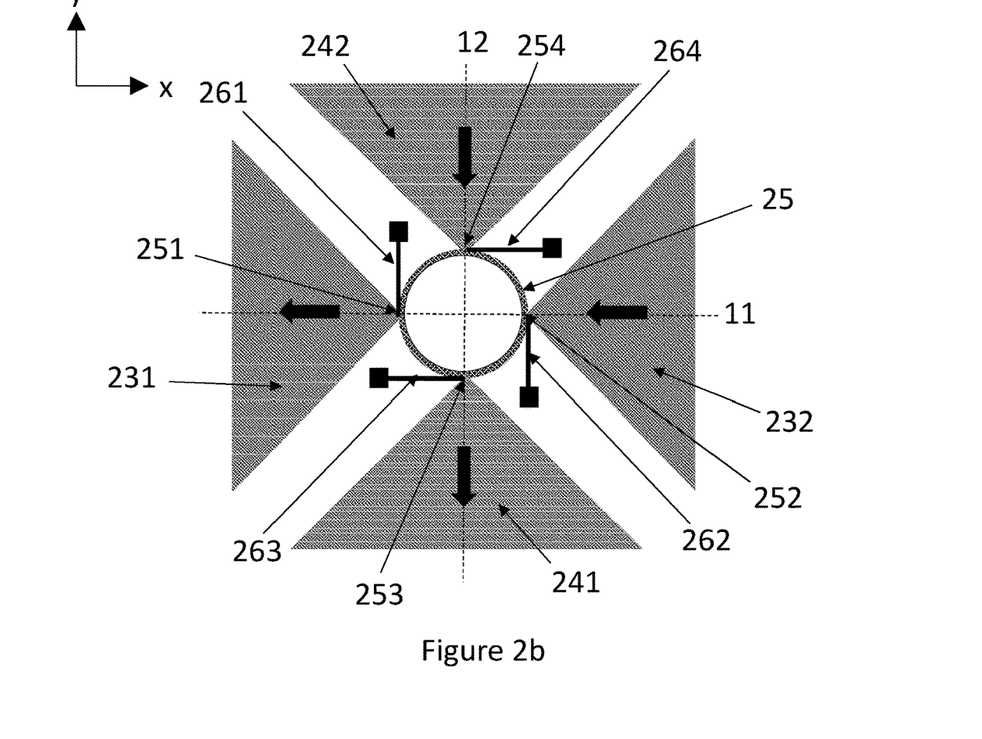
FIGS. 2b, 2d and 2e illustrate the action of an anchored circular synchronization element in undesired oscillation modes.

In contrast, FIG. 2*b* illustrates the undesired oscillation mode which was illustrated in FIG. 1*d*, where the deforming forces which act on the synchronization element 25 do not yield an elliptical shape. The black arrows in FIG. 2*b* now indicate the potential movement of the proof masses which would occur if the movement was allowed. The simultaneous movement of the proof mass pair 231+232 to the left will impart leftward forces to the entire synchronization element 25, trying to displace it without elliptic deformation, but the tangentially oriented linear suspenders 263 and 264 will effectively resist forces acting in the x-direction and will prevent the linear displacement of the element 25. Although the simultaneous movement of the proof mass pair 231+232 to the left may produce some small undesired high order non-elliptic deformation of the synchronization element 25, the synchronization element will be deformed independently on the left and right sides of the second attachment pints 253 and 254. Similarly, suspenders 261 and 262 will resist linear motion in the y-direction, and the simultaneous downward movement of the proof mass pair 241+242 can only produce a small high order deformation in the synchronization element 25.

In other words, a common feature of the desired oscillation mode in FIG. 2a is that it deforms the synchronization element 25 into an elliptical shape along axes 11 and 12, whereby the radial and tangential forces acting in the synchronization element are small. Much stronger radial and tangential forces act on the synchronization element in the undesired oscillation modes illustrated in FIGS. 2b and 1e-1f, where the radial motion of the proof masses try to force the synchronization element to assume a shape which is not elliptical but very close to the initial substantially circular shape. Each linear suspender is designed to resist these tangential forces in two orthogonal directions and thus prevent the linear displacement of the element 25 in any in-plane direction.

At least two anchored linear suspenders, oriented orthogonally in relation to each other, are typically a minimum requirement for effective resistance to linear displacement. If the number of linear suspenders is increased, the orientation requirements are relaxed. Due to the symmetry of the proof mass system around the two axes 11 and 12, four linear suspenders oriented orthogonally as in FIGS. 2a and 2b may often be the most convenient arrangement, but all tangentially oriented linear suspenders will resist linear displacements of the element 25.

Figure 2C:
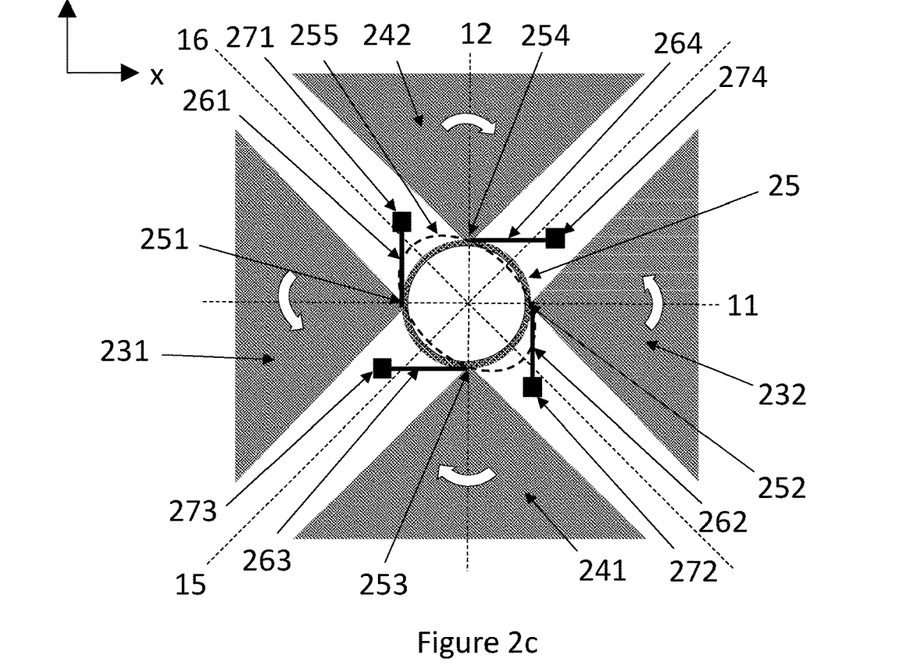

The same desired second oscillation mode which was illustrated in FIGS. 1b and 1c has also been illustrated in FIG. 2c with white arrows on the proof masses. The proof masses are attached to the substantially ring-shaped element 25 at points 251-254, which will now be the centres of rotation of the proof masses. The motion of the centre of gravity of each proof mass is now a combination of rotation and linear displacement shown as curved arrows in FIG. 2c. The substantially circular ring-shaped element 25 will again easily deform to an elliptic shape due to bending moments at the attachment points 251-254 of the proof masses, but it would be relatively stiff for other deformation shapes. In this case the elliptic deformation, shown in FIG. 2c as 255, will be turned by 45 degrees from the elliptic deformation of the first desirable oscillation mode so that the main axes of the ellipse are the axes 15 and 16. The tangentially aligned anchored linear suspenders 261-264 allow the synchronization element 25 to flexibly assume an elliptical shape when the proof masses move in the illustrated manner but prevent the linear displacement of the element 25 in all directions and prevent the rotation of the element around all axes.

Figure 2D:
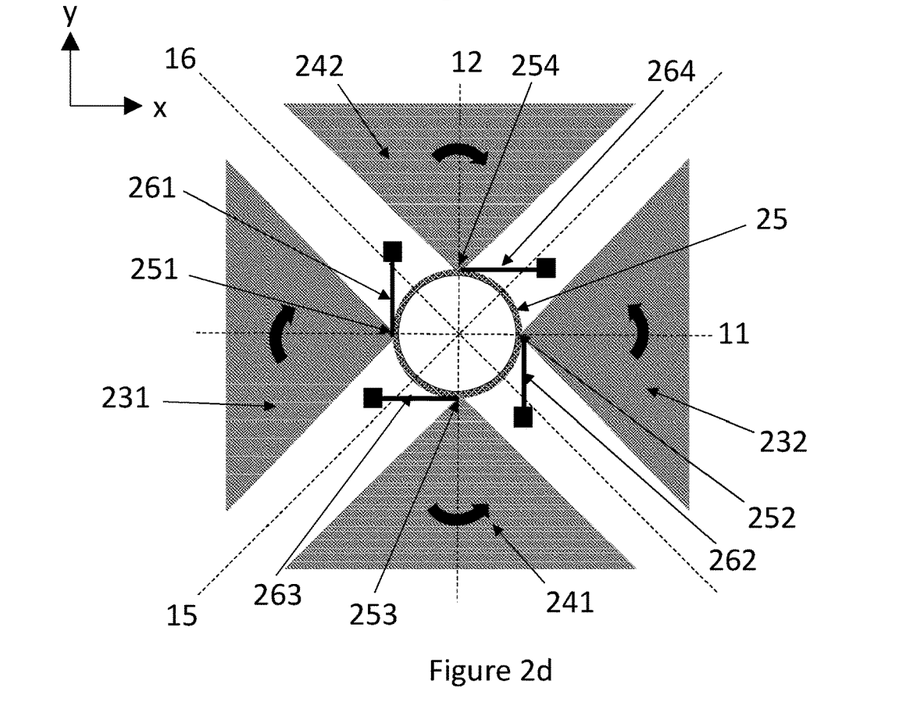

FIG. 2d illustrates the undesired oscillation mode which was shown in FIG. 1e, where the deforming forces which act on the synchronization element 25 do not yield an elliptical shape. The black arrows in FIG. 2d now indicate the potential movement of the proof masses which would occur if the movement was allowed. The simultaneous rotation of the proof mass pair 231+232 upwards will impart downward forces to the entire synchronization element 25, trying to displace it without deformation, but the tangentially oriented linear suspenders 261 and 262 will effectively resist forces acting in the y-direction and will prevent the linear displacement of the element 25. Similarly, suspenders 263 and 264 will resist linear motion in the x-direction, and the simultaneous rightward movement of the proof mass pair 241+242 can only produce a small non-elliptic high order deformation in the synchronization element 25.

Figure 2E:
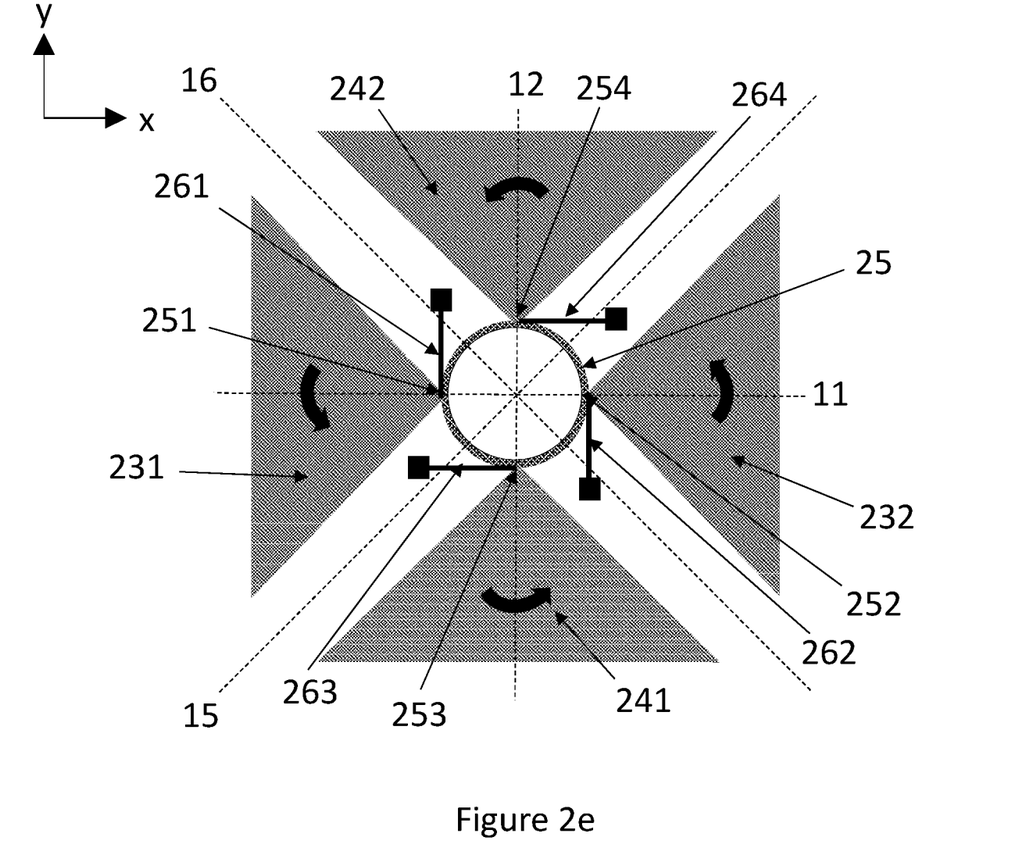

FIG. 2e illustrates the undesired oscillation mode which was illustrated in FIG. 1f, where the deforming forces which act on the synchronization element 25 do not yield an elliptical shape. The black arrows in FIG. 2e now indicate the potential movement of the proof masses which would occur if the movement was allowed. The simultaneous rotation of all proof masses around their centres of rotation will impart a torque to the entire synchronization element 25, trying to rotate it without deformation, but the tangentially oriented linear suspenders 261-264 will effectively resist rotation of the element 25.

In other words, a common feature of the desired oscillation mode in FIG. 2c is that it deforms the synchronization element 25 into an elliptical shape along axes 15 and 16, whereby the tangential forces and bending moments acting in the synchronization element are small. Much stronger tangential forces and bending moments act on the synchronization element in the undesired oscillation modes illustrated in FIGS. 2d, 2e, 1c and 1d, where the motion of the proof masses try to force the synchronization element to assume a shape which is not elliptical and try to linearly displace it in-plane or rotate it in-plane. Each linear suspender is designed to resist these tangential forces and bending moments in two orthogonal directions and thus prevent the linear displacement of the element 25 to any in-plane direction and the in-plane rotation of the element 25.

Figure 3:
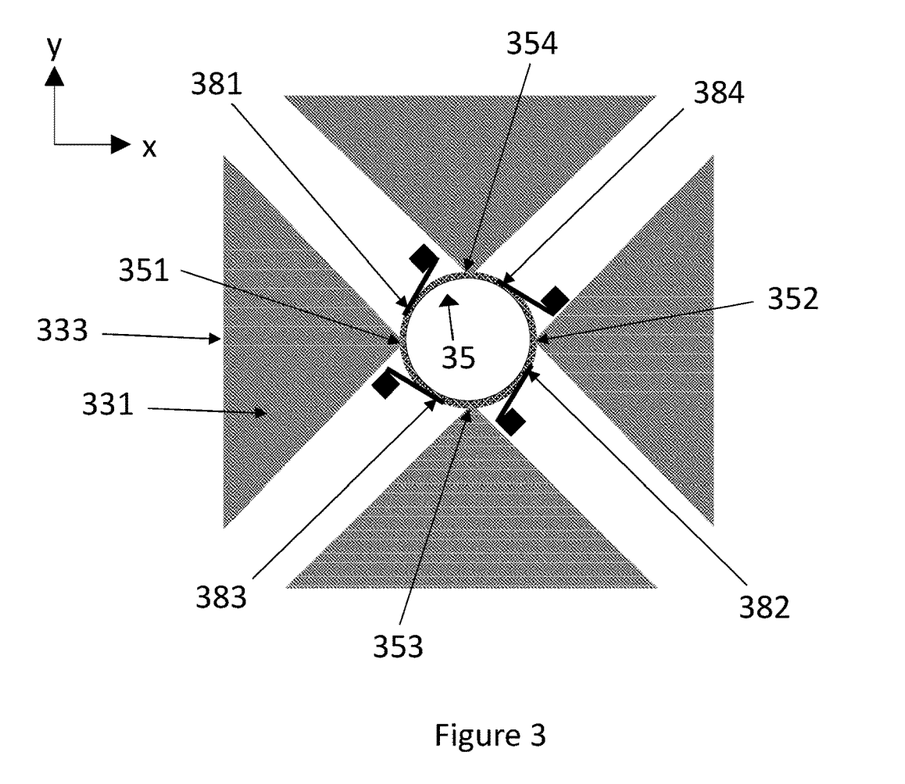
FIG. 3 illustrates an alternative synchronization structure.

FIG. 3 illustrates a synchronization structure where the second attachment points 381-384 do not coincide with the first attachment points 351-354. The linear suspenders can resist displacement and rotation equally effectively in this configuration. Furthermore, the direction of any linear suspender can be freely changed. For example, in FIG. 3 each linear suspender extends in a clockwise direction from a second attachment point to the corresponding anchor point. One or more of the linear suspenders could instead extend tangentially in a counter-clockwise direction from a second attachment point to the corresponding anchor point.

Additional linear suspenders can be added to the synchronization structure, for example so that four linear suspenders extend tangentially from second attachment points 381-384 to their anchor points, while four additional linear suspenders extend tangentially from attachment points 351-354 to their anchor points. In the latter case, the attachment points 351-354 would again function both as first and second attachment points. If the number of linear suspenders increased to more than four, some suspenders may be made shorter than the suspenders in FIG. 3.

In this disclosure, the expression "substantially circular synchronization element" can refer to a ring-shaped element, as elements 25 and 35 in FIGS. 2a-2b and 3, respectively, or for example to an element with the shape of a regular polygon such as an octagon or hexadecagon, where one corner of the polygon is placed at each first attachment point. A synchronization element shaped like such a regular polygon may undergo quasi-elliptical deformation under the desired oscillation modes described above.

Figure 4A:
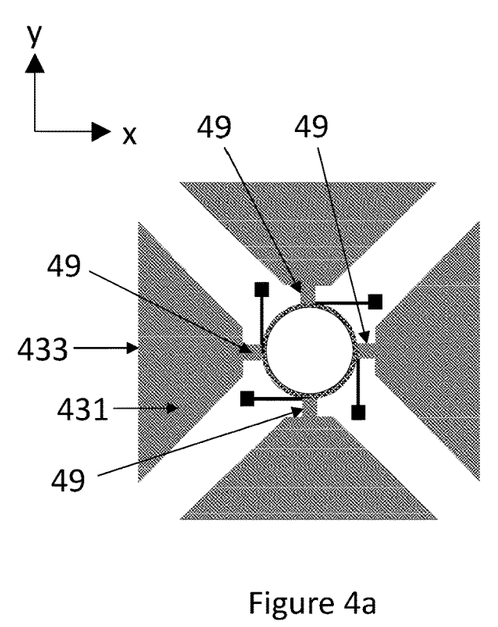
FIG. 4a illustrates alternative attachment of the proof masses.
Figure 4B:
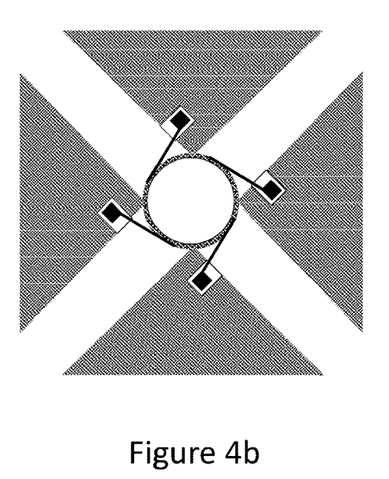
FIG. 4b illustrates alternative anchoring of the synchronization element.

The proof masses do not necessarily have to be attached directly to the first attachment points, as in FIGS. 2a-2b and 3. FIG. 4a illustrates a gyroscope where each proof mass is attached to the first attachment point via an attachment beam 49. This relatively narrow beam may, for example, allow additional linear suspenders, or longer linear suspenders, to be placed near the synchronization element. Alternatively, each anchor point may be located in a cavity formed in a proof mass. This can also allow the number or the length of the linear suspenders to be increased. FIG. 4b illustrates four proof masses with suitably located cavities for the anchor points. The proof mass may surround the corresponding anchor point in the xy-plane in all, or almost all, directions, except in the direction of the linear suspender.

The shape of each proof mass may be substantially that of an isosceles triangle or isosceles trapezoid, pointed towards the gyroscope center point so that the base of each isosceles triangle or isosceles trapezoid is furthest from the gyroscope center point. For example, proof mass 331 in FIG. 3 has the shape of an isosceles triangle. The top of the triangle is located at the first attachment point 351, and the base 333 is the part which is furthest from the center point. Proof mass 431 in FIG. 4a, on the other hand, has the shape of an isosceles trapezoid where the base 433 lies furthest from the center point.

In this context, the expression "substantially that of an isosceles triangle or isosceles trapezoid" means that the shape may not be a perfect triangle or trapezoid. The shape may, for example, comprise cavities like the ones illustrated in FIG. 4b, or a truncated tip.

Figure 5:
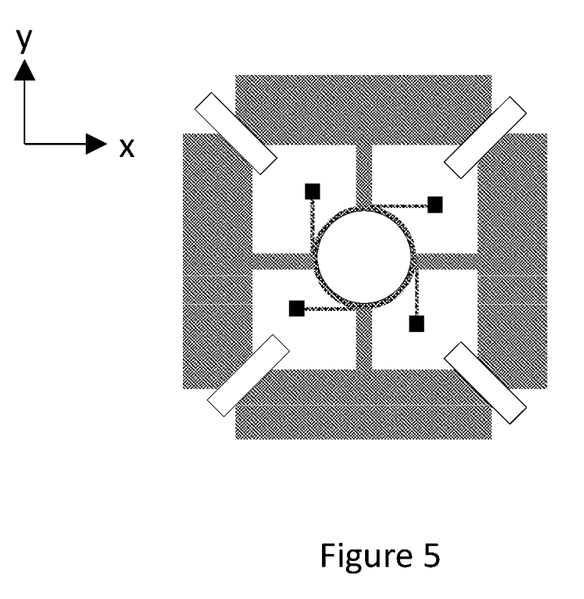
FIG. 5 illustrates alternative proof mass shapes.

Other shapes are also possible. The proof masses may, for example, have a square or rectangular shape, or a hammer-type shape as illustrated in FIG. 5. The corners of the proof mass may be truncated in any proof mass shape, such as in FIG. 5 where the corners of a rectangular shape have been truncated.

The invention claimed is:

1. A microelectromechanical z-axis gyroscope which comprises
   proof mass system centred around a gyroscope center point, where a first axis crosses a second axis substantially orthogonally, and the proof mass system comprises a first proof mass pair which in its rest position is aligned on a first axis, and a second proof mass pair which in its rest position is aligned on a second axis, so that the first and second proof mass pairs in rest position form an essentially symmetrical mass distribution in relation to the gyroscope center point, wherein the first and second proof mass pairs are configured to be driven into a drive oscillation mode in the substrate plane by one or more drive transducers, and to undergo a sense oscillation mode in the substrate plane when the gyroscope undergoes angular rotation,
   where either the drive oscillation mode or the sense oscillation mode comprises oscillatory motion where the first proof mass pair moves in a first linear opposing oscillation along the first axis, symmetrically in relation to the gyroscope center point, and the second proof mass pair moves in a second linear opposing oscillating motion along the second axis, symmetrically in relation to the gyroscope center point, so that the first proof mass pair and second proof mass pair oscillate in anti-phase in relation to the gyroscope center point,
   and the other one of the drive oscillation mode or sense oscillation mode comprises motion where either:
      the first proof mass pair moves in a third linear opposing oscillation away from and back towards their rest positions on the first axis in a direction parallel to the second axis, and the second proof mass pair moves in a fourth linear opposing oscillation away from and back towards their rest position on the second axis in a direction parallel to the first axis, wherein the third linear opposing oscillation and the same linear opposing oscillation have the same phase in relation to their respective rest positions, and the first proof mass pair and the second proof mass pair oscillate in the same phase in the direction of both a third axis and a fourth axis which pass through the gyroscope center point, wherein the third axis and the fourth axis are orthogonal in relation to each other and are tilted at a 45° angle in relation to the first and second axes, or
      both proof masses in the first proof mass pair rotate in a first rotational oscillation in a first direction about vertical axes which pass through each proof mass in the first proof mass pair, while both proof masses in the second proof mass pair rotate in a second rotational oscillation in a second direction, opposite to the first direction and anti-phase in relation to the first rotational oscillation, about vertical axes which pass through each proof mass in the second proof mass pair,
   wherein the oscillation of the first and second proof mass pairs is synchronized by a substantially circular synchronization element which is located closer to the gyroscope center point than the first and second proof mass pairs, wherein the substantially circular synchronization element is centred at the gyroscope center point and comprises four first attachment points, and each first attachment point is located at a point where the substantially circular synchronization element crosses the first or the second axis, and each proof mass is attached to the nearest first attachment point on the substantially circular synchronization element, and
   wherein the substantially circular synchronization element also comprises two or more second attachment points, and a substantially linear suspender extends tangentially from each second attachment point to an anchor point.

2. A microelectromechanical gyroscope according to claim 1, wherein the number of second attachment points is four.

3. A microelectromechanical gyroscope according to claim 2, wherein each first attachment point coincides with a second attachment point.

4. A microelectromechanical gyroscope according to claim 1, wherein the shape of each proof mass is substantially that of an isosceles triangle or isosceles trapezoid, pointed towards the gyroscope center point so that the base of each isosceles triangle or isosceles trapezoid is furthest from the gyroscope center point.

5. A microelectromechanical gyroscope according to claim 1, wherein each proof mass is attached to the first attachment point via an attachment beam.

6. A microelectromechanical gyroscope according to claim 1, wherein each anchor point is located in a cavity formed in one of the proof masses.

* * * * *